United States Patent [19]

Finelli

[11] 3,905,944

[45] Sept. 16, 1975

[54] POLYURETHANE PREPARED WITH 4,4'-DIAMINO DIPHENYL DISULFIDE

[75] Inventor: Anthony F. Finelli, Akron, Ohio

[73] Assignee: The Goodyear Tire & Rubber Company, Akron, Ohio

[22] Filed: May 21, 1973

[21] Appl. No.: 362,587

[52] U.S. Cl.................... 260/75 NH; 260/2.5 AM; 260/77.5 AM
[51] Int. Cl.²........................................ C08G 22/16
[58] Field of Search............... 260/75 NH, 77.5 AM

[56] References Cited
UNITED STATES PATENTS 3,188,302   6/1965   Lorenz...................... 260/77.5 AM

*Primary Examiner*—H. S. Cockeram
*Attorney, Agent, or Firm*—F. W. Brunner; J. D. Wolfe

[57] ABSTRACT

Polyurethane reaction mixtures containing 4,4'-diamino diphenyl disulfide as the curative has sufficient pot life for making castings which are free of fish-eyes, bubbles and other imperfections and can be utilized to make castings as well as foams or nonhomogeneous polyurethane.

1 Claim, No Drawings

POLYURETHANE PREPARED WITH 4,4'-DIAMINO DIPHENYL DISULFIDE

Polyurethane compositions obtained by curing liquid isocyanato-terminated prepolymers with diamines are finding increased use in diverse applications requiring castable elastomers. Because of their abrasion resistance, they are frequently used as coatings on surfaces subject to mechanical wear. Spray application of an undiluted mixture of prepolymer and amine curing agent is a particularly convenient means of preparing such coatings. However, the use of these polyurethanes in spraying as well as other applications has been somewhat restricted due to difficulties encountered in the curing processes with the diamine curing agents currently available. The main difficulty resulting from the use of these and other diamines with the prepolymers currently available is that solvents are usually required. Solvents are undesirable for reasons such as toxicity, flammability and cost. In addition, in spraying applications, the thin films obtained from a single coat of diluted material are seldom adequate for protecting against wear, and the tear strength is low.

The most commonly used amine curing agents are hindered or negatively substituted aromatic diamines of which 3,3'-dichlorobenzidine and 4,4'-methylenebis(2-chloroaniline) (MOCA) are representative. To a lesser extent unhindered aromatic diamines such as 4,4'-methylenedianiline (MDA) and the phenylenediamines are used. The main advantage of the hindered diamine curing agents is their long pot life which in some cases facilitates molding operations. In spray applications, long pot life is undesirable because the freshly mixed and sprayed material often sags or drips before setting up. On the other hand, the unhindered aromatic diamines are so reactive that molding of polyurethanes prepared with their use, whether foamed or otherwise, is almost impossible and in spraying applications, gelling of the polyurethane occurs before the sprayed material has a chance to form an even coating. Furthermore, the highly reactive unhindered amines cause frequent plugging of spray equipment employing internal mixing. Generally, the relatively high melting points and rapid rates of crystallization of both hindered and unhindered diamines make them difficult to mix with the liquid isocyanato-terminated prepolymers and awkward to handle in the absence of a solvent. This is particularly true when the curing agents are used in the field. There has been a need in the art, therefore, for amine curing agents having moderate reactivities and exhibiting a limited tendency to crystallize under normal operating conditions.

Furthermore, prior art polyamine curing agents have been deficient for use in preparing polyurethane foams by reaction of an isocyanate and polyol (or an isocyanato-terminated prepolymer) with said curing agents in the presence of an expanding agent. Unhindered diamines such as MDA promote such rapid reaction that the foam formulation solidifies before full expansion is achieved. Hindered diamines such as MOCA have long pot lives, but once reaction occurs the foam formulation gels so rapidly that only incomplete expansion occurs. Moreover, the properties of foams prepared from prior art curing agents, particularly their compression set, have been disappointing in many cases.

In fact, the crescent tear strength of the polyurethane compositions are so poor in some respects that Kogon in his U.S. Pat. No. 3,194,793 teaches to use a mixture of hindered or related primary diamines with secondary diamines to obtain greatly improved crescent tear strength in the cured polyurethane compositions. This invention provides polyurethane compositions having improved physical properties and especially in crescent tear and provides a method for obtaining said polyurethane compositions.

The polyurethane compositions of this invention are obtained by curing at least a part or all of the excess NCO in the polyurethane reaction mixture with 4,4'-diamino diphenyl disulfide.

The polyurethane reaction mixture can be of the type that generates homogeneous coatings, films and related products or nonhomogeneous products, sometimes referred to as foams of the rigid, flexible, semi-rigid and microporous class. The polyurethane reaction mixture where homogeneous products are to be made preferably is made by preparing a prepolymer or quasi-prepolymer and then adding 4,4'-diamino diphenyl disulfide as the curative. On the other hand, where a non-homogeneous or foamed product is produced, it is preferred to form the polyurethane reaction mixture by simultaneously mixing the ingredients.

In general, the polyurethane reaction mixture is composed of a reactive hydrogen containing material of at least 500 molecular weight selected from the classes of polyols of polyethers, polyesters and hydrocarbons with an excess on the molar basis of an organic polyisocyanate and 80 to 110 percent of 4,4'-diamino diphenyl disulfide based on excess or free isocyanate over the polyol material.

In preparing the polyurethane polymers of the present invention, any of a wide variety of polyisocyanates may be employed either alone or as isomer mixtures or as mixtures of different polyisocyanates. Aromatic, aliphatic and cycloaliphatic diisocyanates and combinations of these types are useful. Arylene diisocyanates, i.e. those in which each of the two isocyanate groups is attached directly to an aromatic ring, are preferred.

Representative polyisocyanate compounds include
toluene 2,4-diisocyanate;
1,4-tetramethylenediisocyanate;
1,6-hexamethylenediisocyanate;
1,10-decamethylenediisocyanate;
1,5-naphthalenediisocyanate;
cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatodiphenylether;
benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluorenediisocyanate;

1,8-naphthalenediisocyanate;
1,3-phenylenediisocyanate;
methylenebis(4-phenylisocyanate);
2,6-diisocyanatobenzfuran;
2,4,6-toluenetriisocyanate and
2,4,4'-triisocyanatodiphenylether.

Other representative organic isocyanates include: polyisocyanates (described in U.S. Pat. No. 2,683,730); organic diisocyanates (described in U.S. Pat. No. 2,292,443); organic triisocyanates (described in U.S. Pat. No. 2,929,794). Mixtures of any of the foregoing organic polyisocyanates can be employed when desired.

The polyether polyol reactants preferably should have a number average molecular weight between about 700 and 6000. The useful polyether polyols are polyalkyleneetherthioether glycols, and polyalkylenearyleneether-thioether glycols and polyalkyleneether triols. Polyalkyleneether glycols are preferred. Mixtures of the polyols may be used when desired.

The polyalkyleneether glycols may be represented by the formula $HO(RO)_nH$ wherein R is an alkylene radical which need not necessarily be the same in each instance and n is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols may be employed if desired. The use of polyalkyleneether glycols in the formation of polyurethane polymers is described in U.S. Pat. No. 2,929,800.

Representative polyalkyleneether triols are made by reacting one or more alkylene oxides with one or more low molecular weight aliphatic triols. The alkylene oxides most commonly used have molecular weights between about 44 and 250. Examples include:
ethylene oxide;
1,2-propylene oxide;
1,2-epoxybutane;
1,2-epoxyhexane;
1,2-epoxyoctane;
1,2-epoxyhexadecane;
2,3-epoxybutane;
3,4-epoxyhexane;
1,2-epoxy-5-hexane; and
1,2-epoxy-3-butene.

Ethylene and propylene oxide are preferred. In addition to mixtures of these oxides, minor proportions of alkylene oxides having cyclic substituents may be present such as styrene oxide, cyclohexene oxide, 1,2-epoxy-2-cyclohexylpropane, and α-methylstyrene oxide. The aliphatic triols most commonly used have molecular weights between about 92 and 250. Examples include glycerol; 1,2,6-hexanetriol; 1,1,1-trimethylolpropane; 1,1,1-trimethylolethane; 2,4-dimethyl-2-methylol-pentanediol-1,5 and the trimethylether of sorbitol. Representative examples of the polyalkyleneether triols include: polypropyleneether triol (M.W. 700) made by reacting 608 parts of 1,2-propyleneoxide with 92 parts of glycerine; polypropyleneether triol (M.W. 1535) made by reacting 1401 parts of 1,2-propyleneoxide with 134 parts of trimethylolpropane; polypropyleneether triol (M.W. 2500) made by reacting 2366 parts of 1,2-propyleneoxide with 134 parts of 1,2,6-hexanetriol; and polypropyleneether triol (M.W. 6000) made by reacting 5866 parts of 1,2-propyleneoxide with 134 parts of 1,2,6-hexanetriol. Further examples of these polyalkyleneether triols are given in U.S. Pat. No. 2,866,774.

The polyester polyols are prepared by condensing carboxylic acids or anhydrides of 4 to 10 carbon atoms with polyols such as the diols or triols which have from 2 to 12 carbon atoms. The preferred polyesters are the adipates, and phthalates of ethylene, propylene, butylene and amylene.

The hydrocarbon polyols are the hydroxyl terminated or containing hydrocarbons formed by polymerization of olefins and diolefins of 2 to 10 carbon atoms alone or combined to form a polymer which is hydroxyl terminated. Examples of these are polybutadiene polyols, polyisoprene polyols, and polyols of the copolymers of butadiene styrene or butadiene acrylonitrile.

The cured polyurethane polymers of this invention have many varied applications. They are particularly useful for machine parts, potting and incapsulation of electronic equipment, and as a metal replacement. Among the many articles and uses to which these cured products are applicable may be mentioned the following: solid tires, mechanical goods, molded, lathe cut, stamped out, cast or dipped; such as grommets, sealing rings, channel rubbers, packing gaskets, mountings, matting (floor covering), tile, rolls, oil-well swabs, pipe-wipers, slush pump pistons, packers, tractor cleats, tank tread blocks, etc.; footwear, heels; coated fabrics of cotton, glass fibers, rayon, wool, polyacrylonitrile, polyester fibers, leather, paper, plastics; films in the form of sheeting, wrapping film, etc.; coating compositions for wood, metal, plastic, concrete, brick, ceramics, leather, etc.; cellular products which may be self-blown or expanded with a blowing agent for use as vibration dampers or shock absorbers.

The following examples will better illustrate the nature of the present invention; however, the invention is not intended to be limited to these examples. Parts are by weight unless otherwise indicated.

EXAMPLE I

A mixture of 50 parts of polytetramethylene ether glycol of 1000 molecular weight and 50 parts of a 1000 molecular weight polyester of caprolactone with butanediol was reacted with cyclohexane-bis(4-methyl isocyanate) at reactive ratio of 1.9 to form a prepolymer. The prepolymer (128.7 parts) was heated to 103°C. under vacuum to degass it and mixed for about one minute with 16.4 parts of the melted 4,4'-diaminodiphenyl disulfide and cast into a mold to form one-half inch sheets. The polyurethane reaction mixture had one to two minutes of pot life and gave castings free of bubbles, fish-eyes and other imperfections frequently obtained with diamine-polyisocyanates which met the hot methylene chloride test of U.S. Pat. No. 2,620,516.

The cured samples had the following physical properties:

| | |
|---|---|
| Tensile at 100 percent elongation | 700 psi |
| Tensile at 300 percent elongation | 2300 psi |
| Ultimate tensile | 3000 psi |
| Ultimate elongation | 350 percent |
| Crescent tear | 260 pounds |

The crescent tear (determined by ASTM Method D-624) is unusual for a primary diamine cured polyurethane composition.

EXAMPLE II

A blend of 1000 and 2000 molecular weight polytetramethylene ether glycol in ratio of 20 and 80 parts respectively was made and then reacted with 4,4'-methylene bis (-2-methyl phenylisocyanate) at reactive ratio of 1.82. This prepolymer was degassed and mixed one minute with sufficient 4,4'-diaminodiphenyl disulfide to react with at least 80 percent but less than 100 percent of the excess or free NCO in the prepolymer and then poured into a mold to cast an 8 inch V-shaped disk having a one-eighth to one-fourth inch metal plate adhered thereto. It was amazing to find an unhindered primary diamine could be used to make coatings of this size without premature gel or fish-eye formation and also be free of bubbles.

Instead of alicyclic polyisocyanate, an aromatic diisocyanate, for example, toluene diisocyanate, could be used in the above formulation to make good castings.

EXAMPLE III

A polypropylene ether glycol of 1000 to 2000 molecular weight was reacted with methylene-bis(4-cyclohexyl isocyanate) to form a prepolymer at reactive ratio of 2,4. Two hundred parts of this degassed prepolymer was mixed with 21.8 parts of 4,4'-diamino diphenyl disulfide and poured into a mold. The coating was cured at 125°C. for two hours and had the following physical properties:

| | |
|---|---|
| Ultimate tensile | 2930 psi |
| Ultimate elongation | 240 percent |
| Crescent tear | 317 pound/inch |

EXAMPLE IV

One hundred parts of polyether polyol blend of 85 percent polypropylene ether triol of 4500 molecular weight and 15 percent polypropylene ether diol containing 21 parts 4,4'-diamino diphenyl disulfide, 0.4 parts water, 0.33 parts triethylene diamine and 0.03 parts dibutyltin dilaurate was mixed with 15 parts of 80/20, 2,4-2,6 isomeric blend of toluene diisocyanate and allowed to foam. The foam cured at room temperature was tough and had excellent tear strength. The fluid properties of the polyurethane reaction mixture were excellent for injection molding shoe soles or microporous parts.

When the reaction mixture was dissolved in suitable solvents such as the hydrocarbon distillates, ketones, for example, acetone or methyl ethyl ketone, chlorinated hydrocarbon, a film could be readily formed by the spray or drawing technique.

The adipate polyesters of ethylene or butylene, for example, could be used to replace the polyethers in the above examples and yet castings of excellent appearance and physicals could be obtained.

EXAMPLE V

One Hundred parts of a 4700 molecular weight polypropylene ether glycol, 2.7 parts of water, 1.0 part of triethylene diamine, 0.03 part of an ethylene/propylene blocked silicone copolymer, 0.5 part of N-ethyl morpholine and 5 parts of 4,4'-diamino diphenyl disulfide were premixed and then mixed with 39.2 parts of a blend of 80 percent toluene diisocyanate and 20 percent of a polyphenyl methane polyisocyanate. The mixture had developed viscosity relatively slowly and thus could be injected or poured into a mold to produce molded foam parts of the high resilient grade which are utilized in seating.

While certain representative embodiments and details have been shown for the purpose of illustrating the invention, it will be apparent to those skilled in this art that various changes and modifications may be made therein without departing from the spirit or scope of the invention.

What is claimed is:

1. A homogeneous polyurethane having a crescent tear of at least 300 pounds per inch and prepared by reacting the excess NCO in a polyurethane reaction mixture consisting essentially of a reactive hydrogen containing material of at least 500 molecular weight selected from the group consisting of polyether polyols, polyester polyols and hydrocarbon polyols, an excess of organic polyisocyanate relative to the reactive hydrogen containing material, with 80 to 110 percent by weight of 4,4'-diamino diphenyl disulfide based on said excess NCO.

* * * * *